United States Patent Office 2,798,298
Patented July 9, 1957

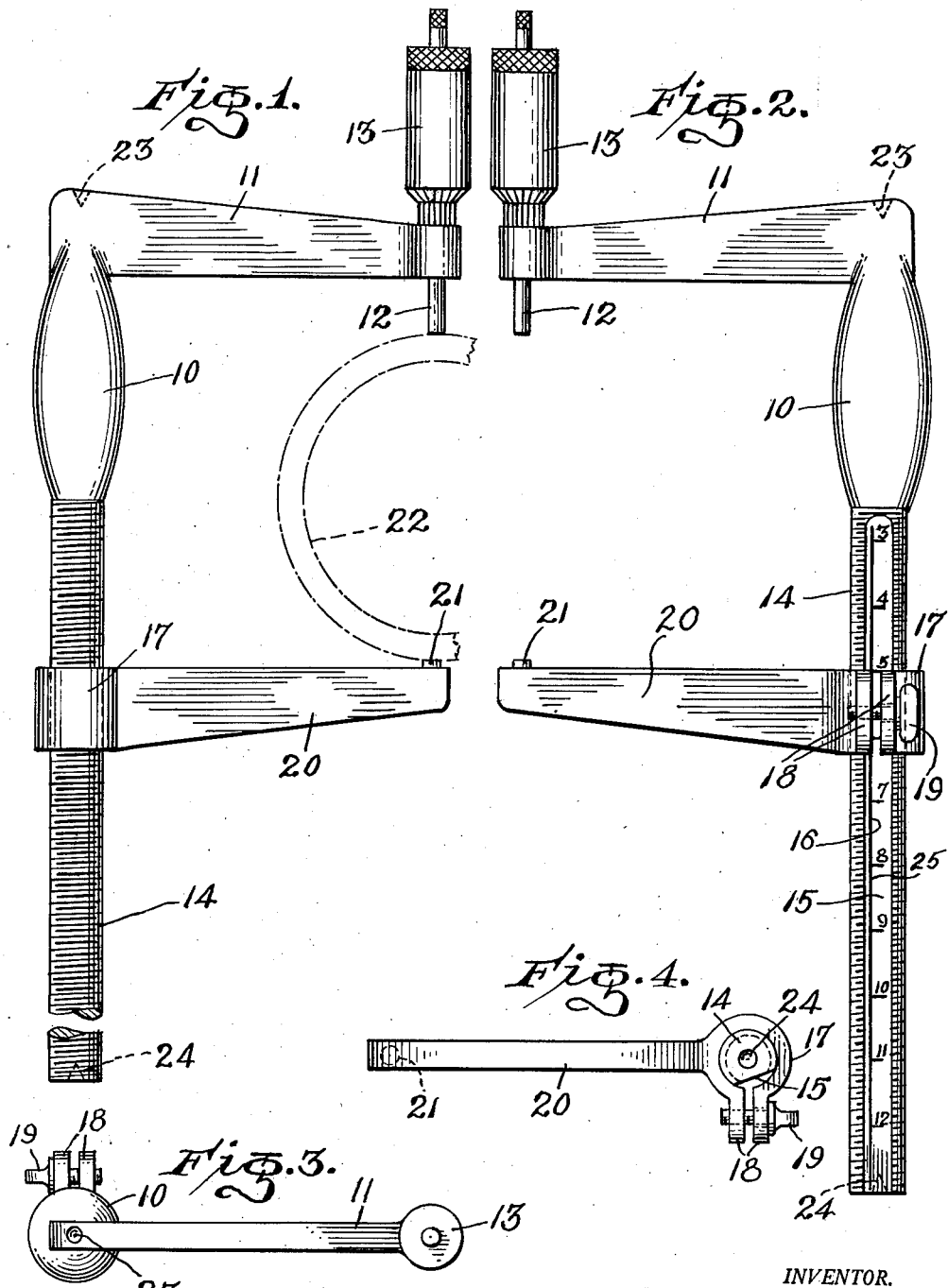

2,798,298
ADJUSTABLE MICROMETER FRAME

James N. Mikkelson, Arnegard, N. Dak.

Application November 29, 1955, Serial No. 549,676

1 Claim. (Cl. 33—165)

This invention relates to micrometers.

It is an object of the present invention to provide a micrometer frame which is adjustable, thus permitting the micrometer to be lengthened or shortened as desired and providing a single tool adapted to measure various sizes of work without the use of extra parts which have to be changed or replaced in the conventional type micrometers of the larger type.

It is another object of the present invention to provide an adjustable micrometer of the above type which provides a unitary tool for measuring several sizes of work whereas in conventional micrometers, several micrometers, or a large micrometer with several interchangeable anvils of different lengths are necessary.

It is still another object of the present invention to provide an adjustable micrometer of the above type which will effect an economy of time inasmuch as the lower arm can be quickly moved to any desired mark and number on a scale provided thereon, and which can be produced at less cost than a set of micrometers or one large micrometer having several interchangeable parts.

For other objects and a better understanding of the invention, reference may be had to the following detailed description taken in connection with the accompanying drawing, in which:

Figure 1 is a side elevational view of a preferred embodiment of the present invention;

Fig. 2 is a side elevational view of the other side thereof;

Fig. 3 is a top plan view of the device; and

Fig. 4 is a bottom plan view thereof.

Referring now more in detail to the drawing, 10 indicates a handle integrally formed at one end at right angles thereto with an upper arm 11. A spindle 12 is rotatably and adjustably mounted near the end of the upper arm 11 and includes a thimble 13, the spindle 12 and thimble 13 being of conventional construction.

The end of the handle 10 remote from the upper arm 11 is integrally formed with an elongated, externally threaded shank 14 having a flat portion 15 on which is inscribed in suitable manner a scale 16, here shown in inches.

An internally threaded sleeve 17 is screwed onto the externally threaded shank 14, the sleeve 17 at one side being open and integrally formed with the ears 18 through which is screwthreaded a thumb screw 19 whereby to lock the sleeve 17 in any desired position.

A lower arm 20 is integrally formed in the sleeve 17 at right angles thereto and is provided at its end with the anvil 21 which cooperates with the spindle 12 to receive therebetween the work 22.

The upper arm 11 is provided with the center hole 23 while the lower end of the shank 14 is provided with the center hole 24.

Upon loosening the thumb screw 19, the lower arm may be adjusted by the rotating sleeve 17 on shank 14, as will be obvious. Upon tightening the thumb screw 19, the sleeve 17 will freeze on the shaft 14 and lock the position of the lower arm 20. The scale 16 includes a longitudinally extending line 25. The ears 18 (Fig. 2) will be aligned with the line 25 when the spindle 12 and anvil 21 are in vertical alignment. The top of the ears 18 will register with the scale 16 to provide a reading. Thus, in Fig. 2 the lower arm is set at the 5 inch mark.

The center holes 23 and 24 are provided for turning the handle 10 and threading the shaft 14.

The device may be manufactured of any suitable metal.

In operation, the reading of the thimble 13 is added to that of the scale 16, as will be obvious. If it is desired to measure a larger or smaller piece of work than that shown in Fig. 1, the thumb screw 19 is loosened to permit the adjustment of the lower arm 20. Threads on the shaft 14 and in the sleeve 17 should be of an even number per inch so that the ears 18 will always be aligned longitudinally with the line 25 when the arm 20 is in the proper relationship to the arm 11. When the desired mark is reached, the ears 18 are aligned with the line 25 and the binding screw 19 is tightened, holding the sleeve 17 and arm 20 stationary on the shaft 14. As shown in the drawing the micrometer has a measuring range of from three to twelve inches, which, of course, may be varied, if desired.

While various changes may be made in the detail construction, it shall be understood that such changes shall be within the spirit and scope of the present invention as defined by the appended claim.

What I claim as new and desire to protect by Letters Patent of the United States is:

An adjustable micrometer comprising, in combination, a bulbous handle, a perpendicularly outwardly extending stationary arm at one end of said handle, a spindle and thimble rotatably mounted in said stationary arm at the end thereof remote from said handle, a second movable arm having an anvil adapted to cooperate with said spindle when aligned therewith, means for adjusting the longitudinal position of said second arm relative to said stationary arm comprising an elongated externally threaded shank integrally formed at the end of said handle remote from said stationary arm and a sleeve internally threaded and screwed onto said externally threaded shank fixedly carried by said movable arm, means for locking said movable arm relative to said stationary arm comprising a pair of perpendicularly outwardly and laterally spaced ears extending from said sleeve and defining a space therebetween, a thumb screw threaded through said ears adapted to draw said ears together to lock said sleeve on said shaft, and said shaft having a flat side extending substantially the entire length thereof, said flat side including a scale having a longitudinally extending line, said ears of said sleeve adapted to be aligned with said line on said scale to align said anvil with said spindle.

References Cited in the file of this patent

UNITED STATES PATENTS

| | | |
|---|---|---|
| 1,393,266 | Cousins | Oct. 11, 1921 |
| 2,144,972 | Hirst | Jan. 24, 1939 |